Patented Jan. 5, 1943

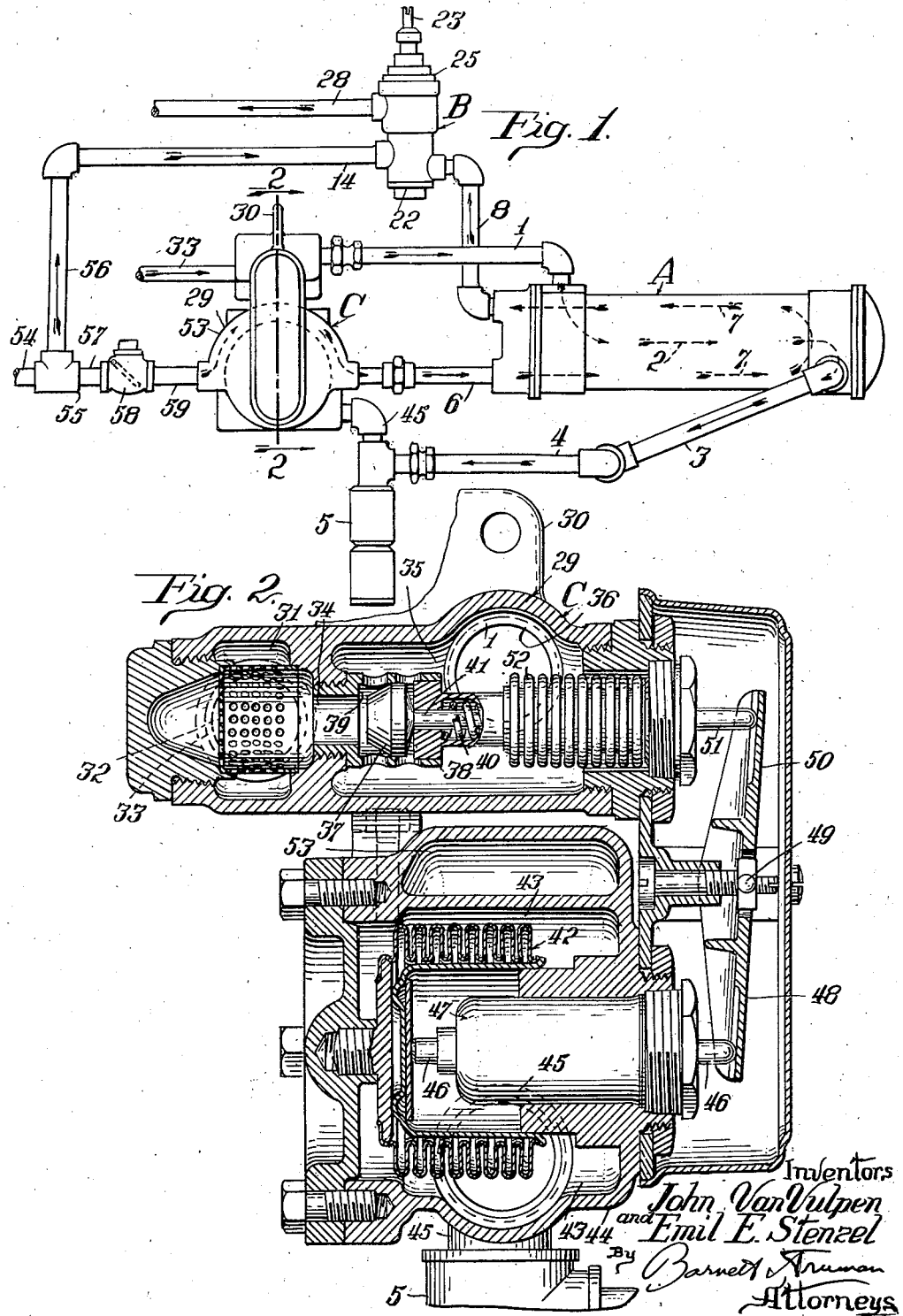

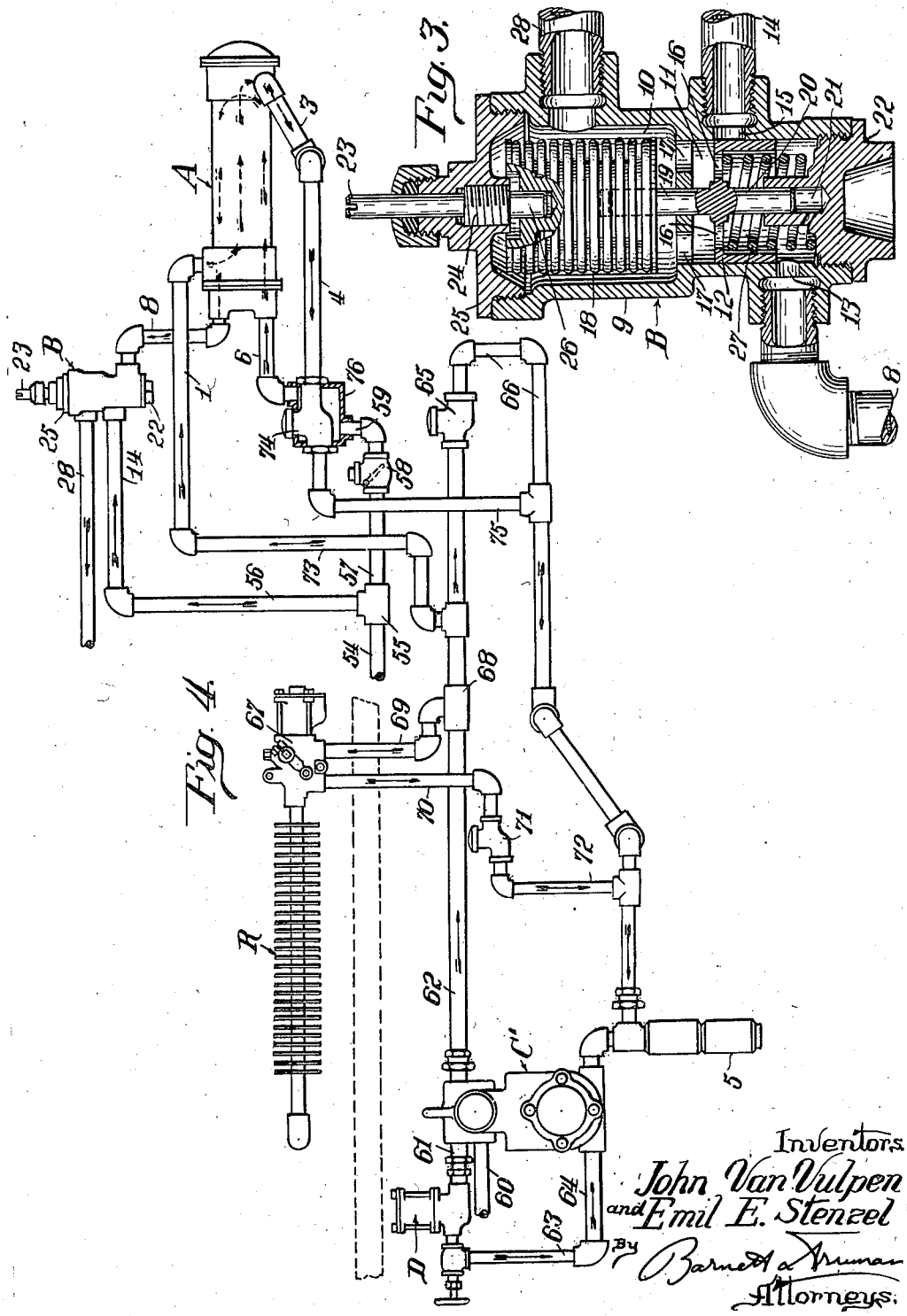

2,307,341

UNITED STATES PATENT OFFICE 2,307,341

SYSTEM FOR PROVIDING HOT WASH WATER

John Van Vulpen and Emil E. Stenzel, Chicago, Ill., assignors to Vapor Car Heating Company, Inc., Chicago, Ill., a corporation of New York Application August 8, 1941, Serial No. 405,912

5 Claims. (Cl. 257—2)

This invention relates to certain new and useful improvements in a system for providing hot wash water, more particularly a system for use on railway cars comprising means for utilizing steam from the heating system on the train for quickly heating water to a rather high temperature so that hot water will be promptly available at the faucets without undue delay or waste of insufficiently heated water.

It is obviously undesirable and uneconomical to carry an unduly large supply of water on the car for washing purposes. It is well known practice to provide a system including a heat-exchanger by means of which a rather small quantity of water is heated by steam to a rather high temperature and then mixed with unheated water so as to provide an adequate supply of hot water at a desired temperature at the discharge faucets. According to this present invention, thermostatic means are provided for more promptly controlling the flow of steam to the heater immediately after the flow of water through the heater is started by the opening of a discharge faucet or faucets.

The principal object of this invention is to provide an improved system for supplying hot wash-water, as briefly described hereinabove and disclosed more in detail in the specifications which follow.

Another object is to provide a water-jacketed thermostatic member positioned in the path of the unheated water flowing to the water-heater, said water-cooled thermostatic member controlling the flow of steam to the heater.

Another object is to provide thermostatically controlled means for increasing the flow of steam to the heater as the flow of unheated water to the heater is increased, and consequently in accordance with an increase in the rate of withdrawal of hot water from the heater.

Another object is to provide a water-jacketed thermostatic member for adjusting a steam-flow control valve.

Other objects and advantages of this invention will be more apparent from the following detailed description of certain approved forms of apparatus constructed and operating according to the principles of this invention.

In the accompanying drawings:

Fig. 1 is an elevation of the principal features of one approved form of apparatus for providing hot wash water.

Fig. 2 is a partial vertical central section through an improved steam-flow regulator provided with a water-jacketed thermostatic control member.

Fig. 3 is a central vertical section through the mixing valve.

Fig. 4 is an elevation, similar to Fig. 1, of a somewhat modified form of hot water supply system connected to and deriving its heat from an improved steam-heating system on a railway car.

Referring first to Fig. 1, the hot water supply system comprises in general a small heater A for transferring heat from steam to cold water, that is water at normal atmospheric temperature, a mixing valve B for mixing the hot water from heater A with cold water such as is supplied to the heater to obtain water at the temperature desired for use and a steam flow controller C for regulating the supply of steam to the heater A.

The heater A is preferably of the general type disclosed in the patent to Keeran, 2,181,602, granted November 28, 1939, although any similar type of heater could be used. Briefly, this heater comprises a plurality of inner passages separated from one another so that water flowing through one series of passages is brought into close heat-transfer relation to steam flowing through the other set of passages. Steam flowing from the supply through pipe 1 passes through one set of interior passages, as indicated diagrammatically by the arrows 2, excess steam and condensate together with non-condensable gases, flowing out through pipes 3 and 4, the steam and non-condensable gases being eventually discharged through insulated drip pipe 5. Cold water flows into the heater through supply pipe 6, thence flows through passages in the heater, as indicated by the arrows 7, the water heated to a relatively high temperature flowing through pipe 8 to the mixing valve B.

Any suitable type of mixing valve B can be used, the one here shown (see Fig. 3) being of the preferred type disclosed in the reissue patent to Russell et al. #19,448, granted March 5, 1935.

Referring to Fig. 3, the main casing 9 encloses a mixing chamber 10 which communicates through suitable openings with the lower, preferably cylindrical, upright valve passage 11 in which is fitted the vertically slidable sleeve valve 12. The hot water supply pipe 8, previously described, connects through port 13 with the lower side of valve passage 11. The cold water supply pipe 14 connects through an upper side port 15 with an upper portion of valve passage 11. When the slide valve 12 is in the position shown in Fig. 3, the port 15 will be closed, but hot water from pipe 8 can flow in through port 13, thence through openings 16 in the top of valve 12 and thence up into the mixing chamber 10 through openings 17. When the valve 12 is moved downwardly so as to close port 13 and open port 15, cold water will flow up through passage 11 and openings 17 into the mixing chamber 10. This vertical movement of valve 12 will be progressive so as to change the proportions of hot and cold water that are admitted through the partially open ports 13 and 15, respectively. This water will mix in chamber 10 so as to expand or contract the thermostatic bellows member 18 to the lower movable end of which the slide valve 12 is connected by the stem 19. A guide stem 20 projecting downwardly from valve 12 is slidable in a guide passage 21 in the plug 22 which closes the lower end of casing 9. The adjusting stem 23 has a threaded portion 24 engaging in the cap 25 which closes the upper end of the casing 9. The lower end 26 of stem 23 engages in a socket in the upper end of thermostatic bellows 18. An expansion spring 27 is confined between the lower plug 22 and the bottom of slide valve 12. As the water in mixing chamber 10 gets hotter, the bellows 18 will expand so as to force the slide valve 12 downwardly and cut off the flow of hot water through port 13 and permit more cold water to enter through port 15. On the other hand, as the temperature of the water in mixing chamber 10 decreases, the thermostatic member 18 will contract and the valve assembly will be forced upwardly by the spring 27 so as to increase the proportion of hot water admitted to the mixing chamber and decrease the flow of cold water. By adjusting the stem 23, the positions of the thermostatic member and valve can be adjusted so that the temperature of the hot water flowing out from mixing chamber 10 through pipe 28 to the discharge faucets can be varied as desired. Stem 23 may also be screwed down to positively force the valve down to cut off the hot water at port 13, in case of fracture of the bellows 18. It will be seen that the water discharged through pipe 8 from the heater A may be much hotter than is desired for use, but the volume of reasonably hot water available for use at the faucets can be greatly increased by mixing this hot water from heater A with cold water supplied through pipe 14 to the mixing valve B.

The steam-flow controller C may take a variety of forms, but is preferably of the type indicated in longitudinal vertical section in Fig. 2. Briefly described, this regulator comprises a casing 29 supported by a suitable bracket 30 and formed with an inlet chamber 31 into which steam flows through port 32 from the supply pipe 33 (Fig. 1). Steam flows from inlet chamber 31 through strainer 33 and passage 34 into the outlet chamber 35 and thence through outlet port 36 and supply pipe 1. The movable valve member 37 is guided in cage 38 so as to engage and cooperate with the valve seat 39 at the outlet end of passage 34 to cut off the flow of steam from inlet chamber 31 into outlet chamber 35. The spring 40 surrounding valve stem 41 tends to move the valve 37 toward the open position shown in Fig. 2.

A thermostatic member indicated generally at 42 is housed in a chamber 43 formed in a separate casing 44. When there is an excess of steam in the heater A, such excess steam will flow back through pipes 3, 4 and 45 into the chamber 43. Thermostatic member 42 comprises an outer bellows diaphragm and contains a quantity of heat responsive fluid so that when the thermostatic member is directly exposed to steam it will expand, thereby forcing outwardly (to the right Fig. 2) the stem 46 which projects through a sealing member 47 and engages at its outer end with the lower arm 48 of a lever pivoted adjustably intermediate its length at 49. The upper arm 50 of this lever is adapted to engage and push inwardly (toward the left—Fig. 2) the stem 51 which projects into sealing member 52 and is adapted to engage valve stem 41 and force the valve 37 toward its seat against the opposition of spring 40. Of course, as the steam in chamber 43 condenses or this chamber is filled with a cooler fluid, the thermostatic member 42 will contract and permit the spring 40 to open the valve 37 so that additional steam can flow to the heater A.

The steam-flow controller just described is of substantially the form disclosed and claimed in the patent to Parks et al. #2,238,369, April 15, 1941, except for the addition as shown in Figs. 1 and 2 of a water-jacket 53 built into casing 44 and partially surrounding the thermostatic chamber 43. Referring again to Fig. 1, cold water flows from the source of supply through T-fitting 55 and thence through one branch pipe 56 and pipe 14 to the mixing valve B. Cold water also flows from the other branch of fitting 55 through pipe 57, check valve 58 and pipe 59 into and through the water jacket 53 and thence through pipe 6 into the water-heater A.

Hot-water supply systems of this general type have been known in which the water-jacketing feature of the steam flow controller was not used, and the cold water supplied to heater A flowed directly from supply pipe 54 and pipe 6 to the water heater. In such a system, if the hot-water faucets are opened soon after a period of use and before the thermostatic member 42 has had time to cool off and contract so as to permit steam valve 37 to open, water will be withdrawn from tank A before there is an adequate steam supply to the tank and this water will be insufficiently heated. Consequently, there will be a waste of water at the discharge faucets before there is an adequate flow of steam to the heat-transfer device A to heat the incoming cold water and deliver the proper supply of hot water through pipe 8 to the mixing valve B.

In the improved system herein described, the moment the faucets are opened there will be a withdrawal of water from heating tank A thereby causing the water passages in this tank to be refilled by cold water from pipe 6 and water jacket 53, so that cold water will flow through this water jacket, before reaching the tank A, thus quickly cooling and contracting the thermostatic member 42 and permitting the steam valve 37 to completely and promptly open. Thus there will be an immediate flow of steam into and through the heat-transfer tank A resulting in a prompt supply of hot water through pipe 8 to the mixing valve B and thence to the faucets. In short, the flow of steam into and through the tank A will be increased promptly as hot water is withdrawn from this tank and the flow of cold water to the tank increases. This is accomplished by the flow of cold water to the heating tank expediting the operation of the steam-flow control valve.

The somewhat modified form of hot wash-water supply system disclosed in Fig. 4 is shown as coupled up with and receiving its steam from a car-heating system of the type disclosed and claimed in the copending application of Parks and Stenzel, Serial No. 335,720, filed May 17, 1940, for Controlled volume steam heating system. A portion of this steam-heating system will first be described, as disclosed in the left hand portion of Fig. 4. The steam-flow control valve C' is of substantially the same type as the controller C shown in Fig. 2, except that the water jacket 53 and the connections thereto are omitted. In other words, this controller C' may be of the type disclosed in the patent to Parks et al. #2,238,369, already referred to. Steam from the usual high-pressure source on the car flows through pipe 60 into the supply chamber 31 (Fig. 2 of this valve). From the opposite sides of the low pressure or outlet chamber 35 extend the two pipes 61 and 62. Pipe 61 leads to a pressure-limit valve D which will open at some predetermined low pressure, for example 5 pounds super-atmospheric pressure. Valve D will remain closed at any pressure in the outlet chamber 35 and pipes 61 and 62 below 5 pounds per square inch but will open when this pressure is exceeded and steam will flow from valve D through pipes 63 and 64 into the thermostatic chamber 43 of the steam regulator. This will cause the thermostatic member 42 to expand and close the valve 39 thus cutting off the supply of steam from pipe 60. At the far end of supply pipe 62 is positioned a steam-trap 65 which closes in the presence of steam, but opens in the presence of condensate and non-condensable gases so as to permit these to escape through the return piping 66 which leads to the drip-pipe 5 already described. Any condensed steam in thermostatic chamber 43 can also flow out through this drip-pipe 5. There may be a restricted flow of steam through trap 65 into the return piping 66 but this will be only sufficient to prevent freezing in this return piping and will not furnish sufficient steam to reach and actuate the thermostatic member in flow controller C'. The trap 65 will restrict the flow of steam from supply pipe 62 so that the pressure in this pipe will build up to a predetermined low but super-atmospheric pressure—for example 5 pounds, as already described—whereupon the valve D will open and permit the steam at this same pressure to flow through pipes 61, 63 and 64 into the chamber 43 and actuate the thermostatic member to close the supply valve. Consequently a substantially constant steam pressure of 5 pounds per square inch will be maintained in the supply pipe 62. If the inlet valve 67 of radiator R is open, steam can flow from supply pipe 62 through the water-seal 68, pipe 69, valve 67 into and through the radiator R and through pipe 70 to the steam trap 71, condensate and non-condensable gases flowing out through discharge pipe 72 into the return piping 66. It will be understood that a plurality of radiators, such as R, can be fed from the same supply pipe 62.

As shown in the right hand portion of Fig. 4, steam from this same supply pipe 62 can also flow through piping 73 and 1 into and through the water-heater A and thence out through pipes 3 and 4, as in Fig. 1. In Fig. 4, discharge pipe 4 leads into a steam trap 74 which embodies a thermostatic member which will close a valve in the presence of steam to preventi the passage of steam beyond this trap but will open to permit condensate and non-condensable gases to flow out through pipe 75 into the return and discharge piping 66. The trap 74 is enclosed by a water-jacket 76.

As in Fig. 1, cold water flows through pipe 54 from the source of supply and thence through T-fitting 55 and pipes 56 and 14 to the mixing valve B. Cold water also flows from the other branch of T-fitting 55 through pipe 57, check valve 58 and pipe 59 into and through the water-jacket 76 and thence through pipe 6 into the water-heater A, all as in Fig. 1. Hot water also flows through pipe 8 from the water heater to the mixing valve B. The operation of this modified system is much the same as in the system disclosed in Figs. 1 and 2. When no water is being discharged through the faucets, steam will flow through the steam piping and the heater A as far as the trap 74. This trap, when heated, will close and will only open often enough and to an extent sufficient to permit the condensate and gases to drain out. Also, since there is no water being withdrawn from tank A, there will be no flow of water through pipe 6 and the water jacket 76 into the heater. The water in jacket 76 will become somewhat heated so as not to cause the trap 74 to open. However, as soon as the hot water faucets are open, the consequent withdrawal of heated water from tank A will cause cold or unheated water to flow from the source through water jacket 76 and thence into the heating tank A. Since this will cause the water jacket 76 to be filled with cold water, the trap 74 will be quickly opened so as to immediately renew the steam flow from the source through the passages of the water-heater A, and provide an immediate supply of water heated to the maximum temperature before the excess of steam flow causes the trap 74 to close.

It will be noted that in either form of the invention, the flow of heating medium or steam to the heat-exchanger is increased immediately in response to an increase in the flow of cold water to the heater so that there will be no undue delay in providing hot water for delivery to the faucets.

It will also be noted that there is no loss of heat at the water-jackets since the heat used at these points preheats the cold water supplied to the water-heater A, thus making the heaters more efficient.

We claim:

1. In a system for providing hot wash-water, a heat-exchanger comprising separated adjacent passages for steam and water, a conduit for supplying steam to the steam passage of the heat exchanger, a discharge conduit for discharging fluids from the steam passage of the heat-exchanger, a steam flow control means in said latter conduit, a water jacket for said flow control means, means for discharging heated water from the heat-exchanger, and conduit means for feeding water to said heat-exchanger, said last-mentioned conduit means including the water-jacket.

2. In a system for providing hot wash-water, a heat-exchanger comprising separated adjacent passages for steam and water, a conduit for supplying steam to the steam passage of the heat exchanger, a discharge conduit for discharging fluids from the steam passage of the heat-exchanger, a thermostatic steam-trap in said discharge conduit, a water-jacket for said trap, means for discharging heated water from the heat-exchanger, and conduit means for feeding water to said heat-exchanger, said last mentioned conduit means including the water-jacket.

3. In a system for providing hot wash water, a heat-exchanger comprising separated adjacent passages for steam and water, a conduit for supplying steam to the steam passage of the heat-exchanger, a discharge conduit for discharging fluids from the steam passage of the heat-exchanger, a steam-flow control means in one of said conduits, a thermostatic means for actuating said flow control means, a water-jacket for said thermostatic-means, a mixing valve, means for discharging heated water from the mixing valve, means for feeding hot water from the heat-exchanger to the mixing valve, conduit means for feeding cold water comprising a branch leading to the mixing valve, and a second branch leading to the heat-exchanger, said second branch including the water-jacket.

4. In a system for providing hot wash-water, a heat-exchanger comprising separated adjacent passages for steam and water, a conduit for supplying steam to the steam passage of the heat-exchanger, a discharge conduit for discharging fluids from the steam passage of the heat-exchanger, a thermostatic steam-trap in said discharge conduit, a water-jacket for said trap, a mixing valve, means for discharging heated water from the mixing valve, means for feeding hot water from the heat-exchanger to the mixing valve, conduit means for feeding cold water comprising a branch leading to the mixing valve, and a second branch leading to the heat-exchanger, said second branch including the water-jacket.

5. In a system for providing hot wash-water, a heat-exchanger comprising separated adjacent passages for steam and water, a conduit for supplying steam to the steam passage of the heat-exchanger, a flow-control valve in said supply conduit, a thermostatic member for controlling said valve, a water-jacket for said thermostatic member, a mixing valve, means for discharging heated water from the mixing valve, means for feeding hot water from the heat-exchanger to the mixing valve, conduit means for feeding cold water comprising a branch leading to the mixing valve, and a second branch leading to the heat-exchanger, said second branch including the water-jacket.

JOHN VAN VULPEN.
EMIL E. STENZEL.